United States Patent [19]

Hölter et al.

[11] 4,176,462
[45] Dec. 4, 1979

[54] APPARATUS FOR INSPECTING THE GEOMETRY OF DUAL ROLLER TRACKS FOR CONTINUOUS CASTINGS

[75] Inventors: Karl Hölter; Gustav Wiegard, both of Witten, Fed. Rep. of Germany

[73] Assignees: Mannesmann Aktiengesellschaft, Düsseldorf; Gustav Wiegard Maschinenfabrik, Witten, both of Fed. Rep. of Germany

[21] Appl. No.: 957,233

[22] Filed: Nov. 2, 1978

[30] Foreign Application Priority Data

Nov. 3, 1977 [DE] Fed. Rep. of Germany ....... 2749539

[51] Int. Cl.² ........................... G01B 7/00; G01B 7/28
[52] U.S. Cl. ..................................... 33/182; 33/147 L; 33/149 J; 33/174 L
[58] Field of Search .................. 33/182, 143 L, 143 R, 33/147 K, 147 L, 147 N, 178 E, 178 F, 313, 149 J, 174 P, 174 Q, 174 L, 174 R; 164/4, 150

[56] References Cited

U.S. PATENT DOCUMENTS

| 3,023,508 | 3/1962 | Saurenman | 33/178 F |
| 3,939,568 | 2/1976 | Gonos et al. | 33/143 L |
| 3,962,794 | 6/1976 | Kima et al. | 33/174 L |
| 4,132,003 | 1/1979 | Schrewe et al. | 33/182 |

FOREIGN PATENT DOCUMENTS

207339 11/1968 U.S.S.R. ................... 33/178 F

Primary Examiner—Willis Little
Attorney, Agent, or Firm—Smyth, Pavitt, Siegemund, Jones & Martella

[57] ABSTRACT

A parallelogram-like collapsible frame has centering rolls in opposite corners for engaging one roll each per track and across the track path; these centering rolls establish a center line of reference on which one or two, straight or curved rulers are pivoted to engage other track rollers, and the angle of pivoting represents the radius of curvature or a deviation from a desired radius.

6 Claims, 5 Drawing Figures

4,176,462

APPARATUS FOR INSPECTING THE GEOMETRY OF DUAL ROLLER TRACKS FOR CONTINUOUS CASTINGS

BACKGROUND OF THE INVENTION

The present invention relates to an apparatus for inspecting and ascertaining the relative disposition of the rollers in dual roller and support tracks provided for withdrawing continuous castings along a curved path. U.S. Pat. No. 4,148,145 Ser. No. 827,614, filed Aug. 25, 1977 discloses a device in which a parallelogram-like collapsible frame is passed through the tracks by means of a cable, chain or the like, and which is provided on two opposite corners with centering rollers to engage two oppositely located track rollers. Feelers determine the distance between these two track rollers, and the frame is passed along the tracks to ascertain this way the effective width between the roller tracks as defined by the spacing of rollers being located opposite to each other, and to determine particularly any unwanted deviation from the required width.

The U.S. Pat. No. 4,132,003 Ser. No. 827,570 filed Aug. 25, 1977 uses a basically similar type of frame, but is provided with a different set of feelers to measure the effective curvature of the casting path as between the two tracks.

The present invention relates particularly to equipment of the type of those two patents and includes particularly such a foldable frame, centering rollers on two corners for engaging two opposite track rollers.

DESCRIPTION OF THE INVENTION

It is an object of the present invention to measure the curvature of a dual roller track for withdrawing a continuous casting.

It is a particular object of the present invention to measure such a curvature by means of an apparatus which includes a foldable frame having two oppositely located corners in each of which is provided a pair of centering rollers for engaging track rollers in that the centering rollers of the two opposite frame corners engage two track rollers of different tracks in an operating position of the frame.

In accordance with the preferred embodiment of the present invention, it is suggested to establish a center line between the centering rollers traversing the two track rollers, and to pivot one or two straight or curved rulers on the center line to engage the track roller(s) next to one of them traversed by the center line in the operating position of the frame, and to measure the angle or angles of the rulers relative to the center line in a representative direction. The angle or angles are parameters which permit direct determination of the track radius. The measurement may take place on either track. The construction has the advantage of minimizing the number of sensing elements which are to cooperate in a rather rough environment.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
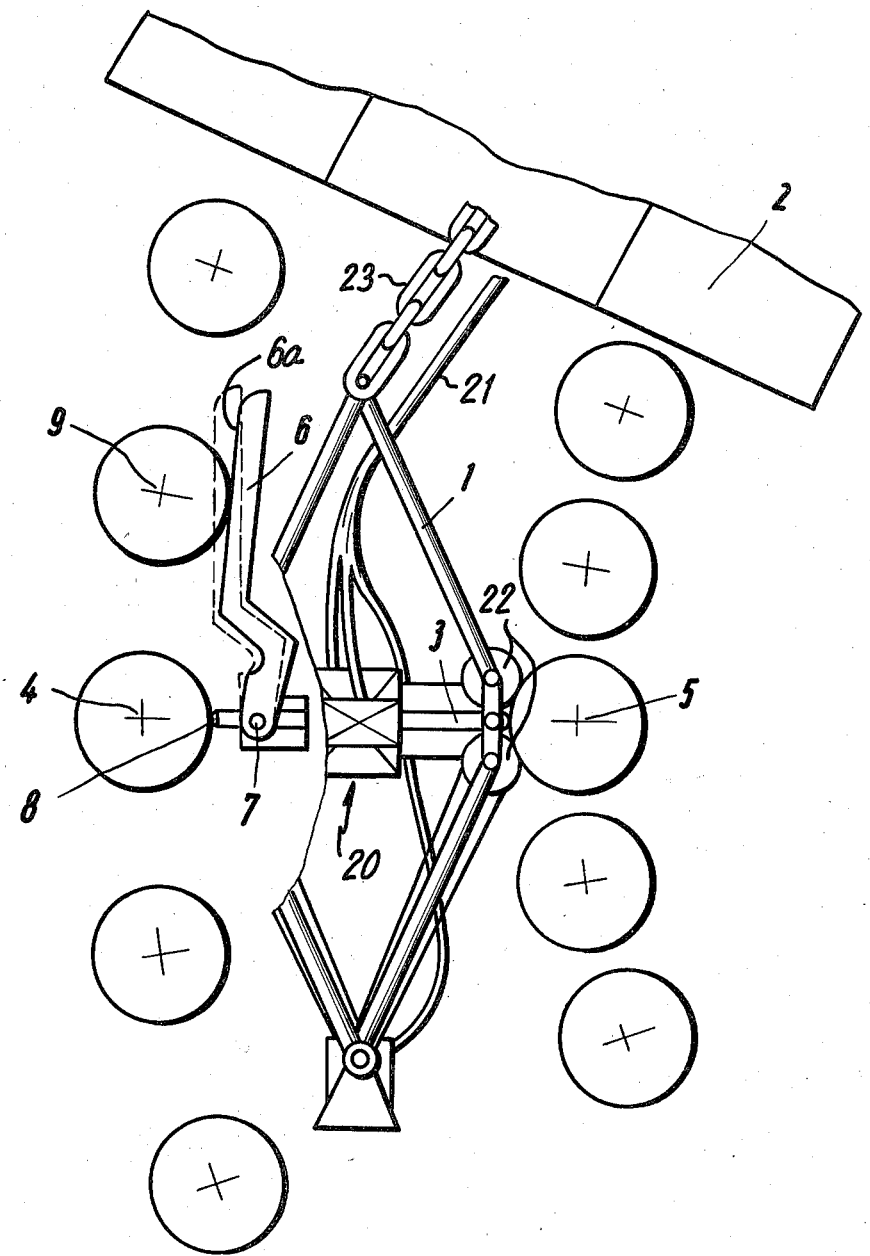
FIG. 1 is a side view of a device in accordance with the preferred embodiment of the invention and as positioned between the rolls of two tracks under a mold for continuous casting.

Proceeding now to the detailed description of the drawings, FIG. 1 and others show a frame 1 of the collapsible variety and having parallelogram-like configuration. The frame has a central portion 20 in which terminate cable 21 for various purposes. Two opposing corners of that frame are provided each with a pair of centering rollers such as 22 and 22a, which are disposed symmetrical to an axis 3'.

The frame 1 as such and including the centering rollers 22, 22a, further including a suspension chain 23 and the central supporting equipment are constructed basically as described in the above-identified patents whose contents are incorporated by reference as to these supporting and construction features for the frame.

The frame 1 is shown suspended by chain 23 between the rollers of two tracks, of which two rollers, one per track, are identified by numerals 4 and 5 in FIG. 1 and others. The two tracks extend from adjacent the bottom of a mold 2 for continuous casting and are provided to withdraw and support the casting as withdrawn from the mold during casting and solidification.

A pair of feeler arms 3 may be provided to measure the distance between opposing rollers of the two tracks, such as 4 and 5, and these feelers establish a spacing axis or center line 3' along which that distance may be measured. That axis 3' extends symmetrically to the centering roller pairs, such as 22 and 22a. A more general definition of line 3' will be given below.

Now, in addition, a ruler or straight edge 6 is pivotally mounted on the frame 1 by means of a pin 7. The normal position of that ruler is indicated in dotted lines, and its operating edge 6a extends in that position precisely at right angles to the axis 3' of feelers 3 as well as to a direction transversely to that axis which, in the operating position of the frame, runs parallel to the axes of the rolls 4 and 5.

The geometric conditions can be generalized as follows. The edge 6a turns in a particular plane transversely to its pivot axis on and about pin 7. The center line 3' is a line in that plane, and it is located symmetrically to the centering rollers of the pair 22 as well as to the centering rollers of pair 22a. Whether or not distance measuring feelers are disposed in that line 3' is incidental (except in the case of FIG. 5, infra); it should be realized that due to the cylindrical configuration of the track rollers 4, 5, lines parallel to that line 3' can likewise be used as center line reference. The "normal" disposition of straight edge or ruler 6 (dashed lines) extends at right angles to that line 3'.

Assuming that the down direction from the mold is the direction of frame advance, straight edge or ruler 6, extends in trailing direction thereto. Specifically, it will engage the one track roller 9 next to roller 4 of the same track and upstream from the latter considering the direction of casting advance as the downstream direction.

Due to the curvature of the roller tracks, straight edge 6 when engaging that roller 9 establishes an angle α to its normal (dashed-line) disposition on account of pivoting about pivot 7. The ruler or straight edge 6 has an offset portion 16, and the end thereof is pivoted by means of the pivot pin 7, and is mounted therewith on a support 17. That support 17 may be part of the distance measuring device in that corner of frame 1. The support 17 includes a transducer 15 which measures the pivot angle α of the ruler 16. The output of that transducer is signaled through the cable 21.

A pin 18 extends from support 17 having a tip 8 which establishes a zero level for the straight edge proper 6a. The pin extends in the axis 3' which, as stated, may be or runs parallel to the axis of the distance measuring feelers. Or, to state it differently, the pin 18 is positioned so that its tip 8 engages a track roller, such as 4 on a line representing the shortest distance between the two rollers 4 and 5 which position is established by the centering rollers such as 22 and 22a. The zero position of the straight edge is defined by a position of edge 6a on a line that runs at right angles to pin axis 3' and through the pin tip 8. The tilt angle α of the edge is established when the feeler 18 engages a roller such as 4 and the edge 6a abuts the rolls next to it, such as 9. This angle α is a representation of the curvature of the roller track.

If S is the center-to-center spacing of adjacent rollers of the same track, the radius of curvature as to determined, is given by S/2·cos (90°−α). This radius of curvature is specifically the radius of a circle that runs through the centers of the track rollers of the same track. The spacing A between pivot 7 and tip 8 does not enter into the calculation, as it determines only the extent of the offset 16 of the ruler from its zero position.

Figure 2:
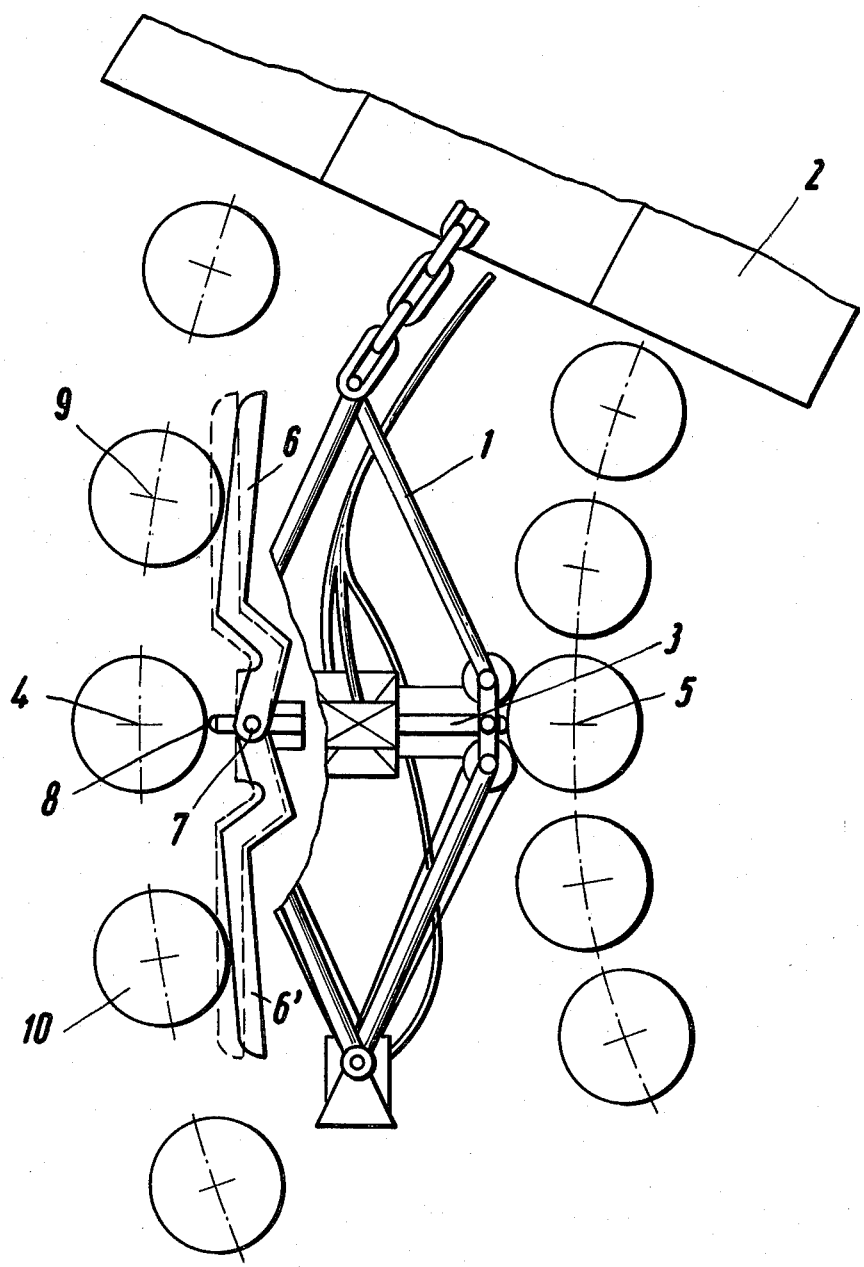
FIG. 2 is a similar view of a similar device but supplemented for obtaining two parameters to be measured at a time.
Figure 3:
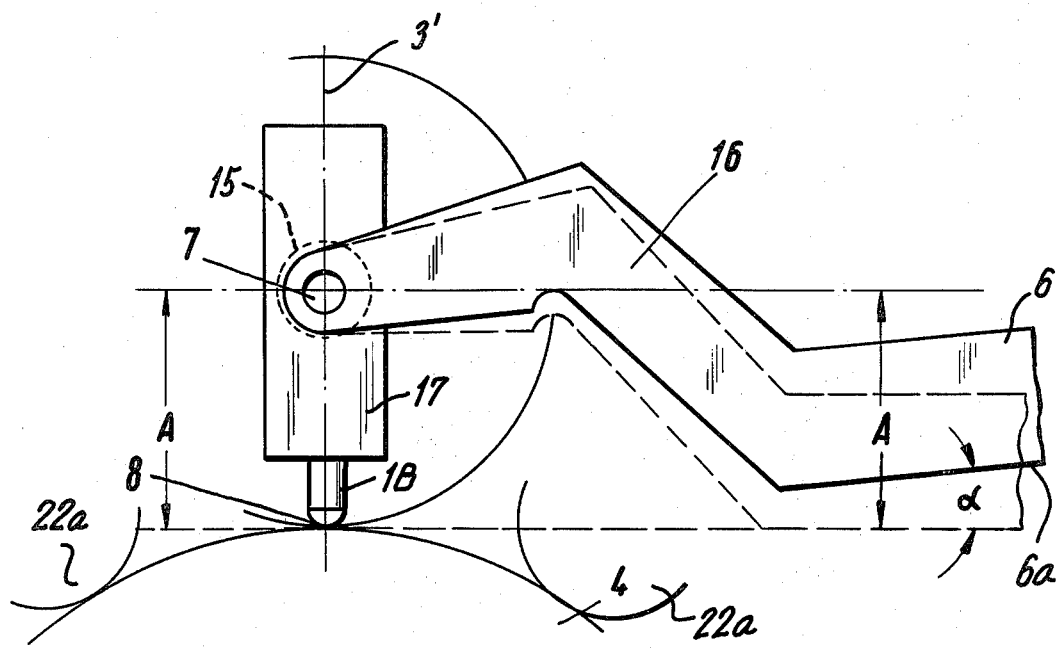
FIG. 3 is an enlarged view of a detail of the preceding figures.

Since the spacing S of the rollers is subject to some tolerances, measurement across three rollers will yield a better result. Accordingly, it is advisable to use a second straight edge 6' (FIG. 2) which points in the opposite direction and will engage the next roller upstream, being roller 10 in the instance shown in FIG. 2. It is not essential in this case that each edge has a zero position transversely to the axis 3'. However, the point of engagement of tip 8 with roll 4 must be on a line of shortest distance between the opposite roller, which is 5. Any rotation of the axis between pin tip 8 and the pivot axis or point 7, about tip 8, adds or substracts the same angle to the position of edge 6' on account of such tilt. The dual angle measurement compensates this error; the radius of curvature will be given in either case by the average of the two angles to be set into the formula above as angle α.

Figure 4:
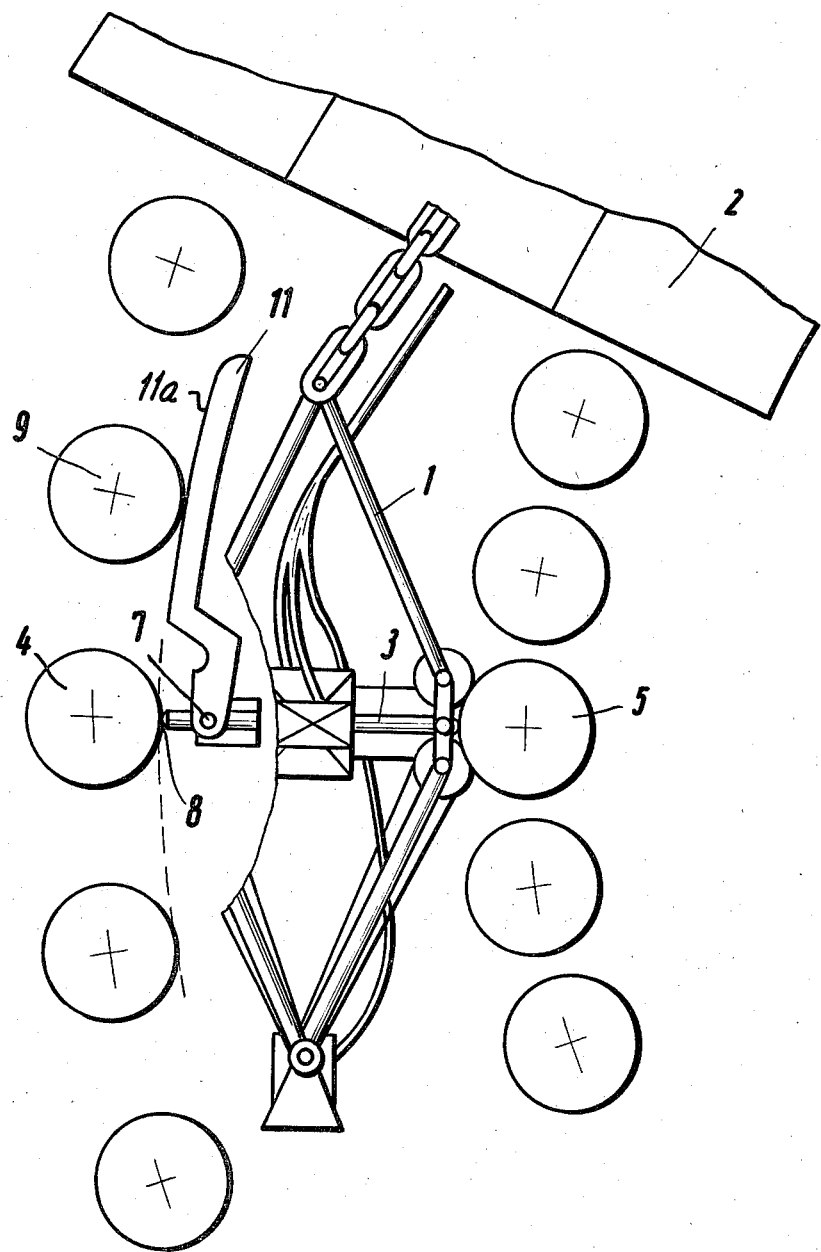
FIG. 4 is a view similar to FIG. 1, but showing a measuring component in modified configuration.

In cases, it may not be necessary to actually measure the radius of curvature. Rather, the detection process may be provided to ascertain whether or not the track radius has a specific desired value. In this case, one will use a templet-like ruler 11 (FIG. 4), whose edge 11a has a curvature that represents the tangent circle 14 on the rollers of the track. FIG. 4 actually illustrates the zero position of that curved ruler established when the upstream roll 9 is offset corresponding to the desired radius of curvature of the track (tangent circle 14). Any tilt angle now measured represents a deviation from that ruler circle.

Figure 5:
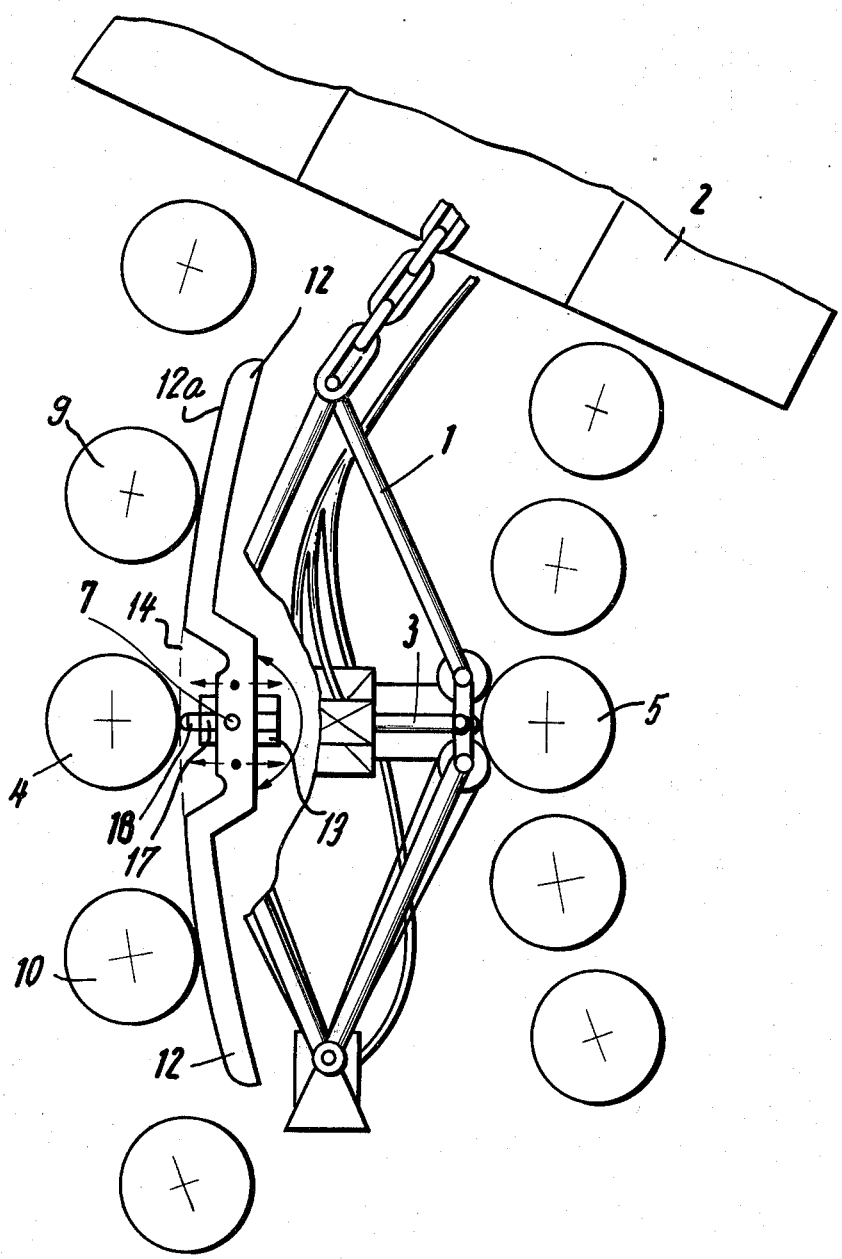
FIG. 5 is a similar view modified somewhat analogously as FIG. 2 modifies FIG. 1.

For reasons similar to those mentioned above for straight edge type measurements, it is advisable to extend the measurement across three rolls, such as 4, 9 and 10 in FIG. 5. A long, curved templet 12 is provided to engage the two outside rolls 9 and 10 adjacent the roll 4 to which the frame 1 is centered on that particular track.

The templet or ruler 12 is pivotally mounted on the transducer 17, pivot point 7, having a feeler 18, but being additionally mounted in a second transducer and drive 13, e.g. a solenoid or voice coil motor type of device which moves the pin 18 towards and away from roll 4 as the case requires, if the relative position of roll 4 is off the tangent circle 14 along which templet 12 engages the two rollers 9 and 10. Thus, one obtains in this device a single tilt angle of curved ruler 12, and a liner displacement of the tip representing directly a Δr, being the deviation of the actual radius of curvature from the one outlined by the ruler, if the tilt angle thereof is zero. A non-zero value for the angle, with or without a linear displacement, is also a representation of a track radius error but occurring a little more upstream or downstream.

In all these cases, one will move the frame 1 from operating position to operating position, each being defined by corner alignment of the frame (centering rollers 22, 22a) with two oppositely placed track rollers, one per track. In each instance, one will obtain an angle and/or (in FIG. 5) a linear displacement value. By repeating the measurement along the entire track, one obtains a geometric distribution of track radii along the track which represents the accuracy of the track as a whole as well as local deviations therefrom. It can also be seen that the operating parts and feelers are quite small so that this device is well suited in the rugged environment of a withdrawal and support path for continuous castings.

The invention is not limited to the embodiments described above but all changes and modifications thereof not constituting departures from the spirit and scope of the invention are intended to be included.

We claim:

1. Apparatus for determining the relative disposition of rollers in a dual roller track for withdrawing a continuous casting, the apparatus including a foldable frame having two opposing corners each provided with at least one pair of centering rollers for establishing a center line between said corners which extends transversely to the tracks when the pairs of centering rollers engage oppositely located rollers of the track in an operating position of the frame, the improvement comprising:

at least one ruler having an offset portion;
   means for pivotally mounting said ruler at said offset portion on a point on said center line at a distance from one of the rollers traversed by said line when said frame is in said operating disposition; and
   means for measuring the pivot angle of said ruler when engaging a track roller of the same track as the one roller and being disposed next to it, the pivot angle being taken to said center line or a line having a fixed orientation to that center line.

2. Apparatus as in claim 1, said ruler being oriented to engage a roller upstream from the one roller.

3. Apparatus as in claim 2, and including a second ruler pivoted on said line and engaging a roller downstream from the one roller.

4. Apparatus as in claim 1 or 3, said ruler or rulers having a straight edge.

5. Apparatus as in claim 1 or 3, said ruler or rulers having a curved edge.

6. Apparatus as in claim 3, and including a feeler disposed along said center line to ascertain a distance of said pivot points from a point of engagement of the feeler with the one roller.

* * * * *